B. F. BAILEY.
EGG BOX.
APPLICATION FILED FEB. 24, 1917.

1,324,760.

Patented Dec. 9, 1919.
2 SHEETS—SHEET 1.

WITNESSES
M. R. McInnis
E. A. Paul

INVENTOR
BENJAMIN F. BAILEY
BY Paul & Paul
ATTORNEYS

B. F. BAILEY.
EGG BOX.
APPLICATION FILED FEB. 24, 1917.
1,324,760.
Patented Dec. 9, 1919.
2 SHEETS—SHEET 2.
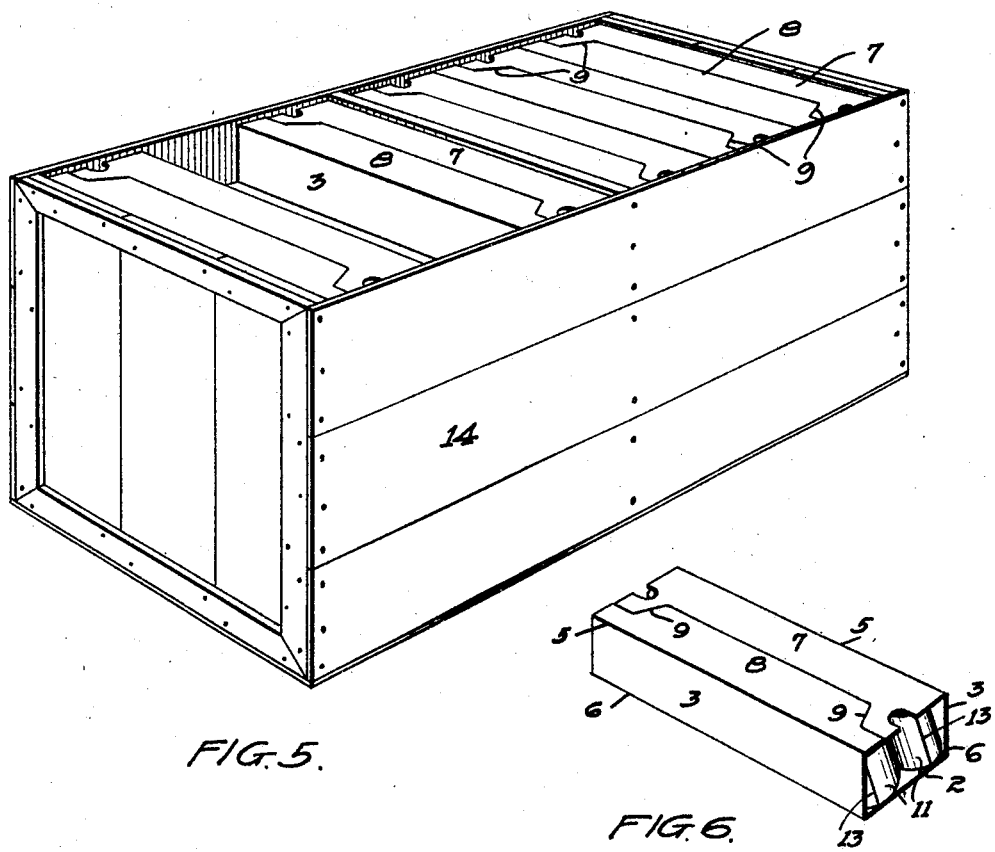
FIG. 5.
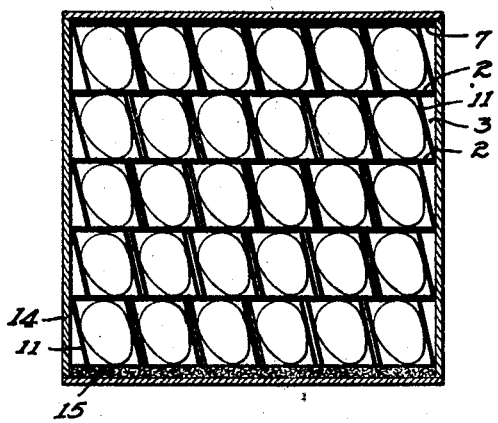
FIG. 6.
FIG. 3.
WITNESSES
M. R. McInnis
E. A. Paul
INVENTOR
BENJAMIN F. BAILEY
BY Paul & Paul
ATTORNEYS

UNITED STATES PATENT OFFICE.

BENJAMIN F. BAILEY, OF MINNEAPOLIS, MINNESOTA, ASSIGNOR, BY DIRECT AND MESNE ASSIGNMENTS, TO CHAS. WEINHAGEN & COMPANY, OF ST. PAUL, MINNESOTA, A CORPORATION OF MINNESOTA.

EGG-BOX.

1,324,760.     Specification of Letters Patent.     Patented Dec. 9, 1919.

Application filed February 24, 1917. Serial No. 150,671.

*To all whom it may concern:*

Be it known that I, BENJAMIN F. BAILEY, a citizen of the United States, resident of Minneapolis, county of Hennepin, State of Minnesota, have invented certain new and useful Improvements in Egg-Boxes, of which the following is a specification.

The object of my invention is to provide an egg box in which a number of eggs can be securely packed without danger of breakage and without taking up unnecessary room or space in the case in which the eggs are packed.

A further object is to provide a box in which the eggs will be so hung in the pockets that transmission of pressure from the eggs in one row to another, directly above or beneath, will be prevented.

Other objects of the invention will appear from the following detailed description.

The invention consists generally in various constructions and combinations, all as hereinafter described and particularly pointed out in the claims.

In the accompanying drawings forming part of this specification,

Fig. 3 is a vertical sectional view through a case, showing the manner of arranging the eggs in the box and the relative position of the eggs in one row with respect to the adjacent rows.

Fig. 5 is a perspective view of an egg case with the boxes of eggs packed therein.

Fig. 6 is a perspective view of a filled box.

Figure 1:
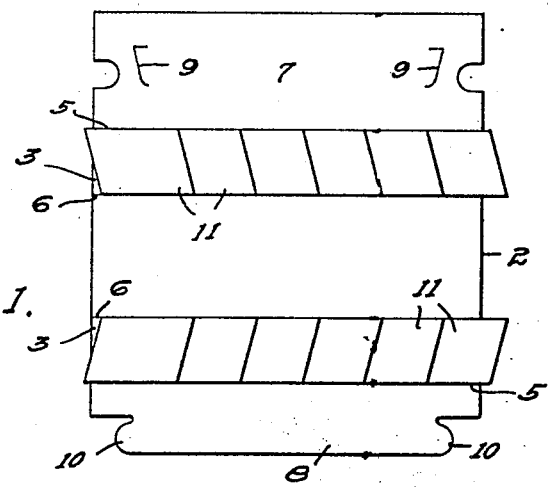
Figure 1 is a plan view of the box unfolded, ready for use.

In the drawing, Fig. 1, a blank is shown, having a bottom panel 2, side panels 3 formed by scoring the blank along parallel lines 5 and 6, and 7 and 8 are flaps forming the top of the box when closed, the former having slits 9 therein to receive a tongue 10 formed on the edge of the flap 8. Upon the side walls 3 pockets for the eggs are mounted. Each pocket consists of a flexible band 11 bent into the form of a loop and having its ends lapped by one another and attached to the wall of the box at 12. The bands forming the egg pockets are creased for folding at two opposite points 13, so that when not in use the pockets may be closed and lie flat against one another and against those portions of the blank forming the walls of the pockets when the blank is folded. The flaps at the ends of the blank will also lie flat, so that the device can be stored conveniently or packed for shipment. The pockets are open at the top and bottom and when eggs are inserted therein the walls are spread apart and being bent or folded at two points only these walls, when separated, will bear on the shells of the eggs with a slight pressure sufficient to hold them in place.

Figure 4:
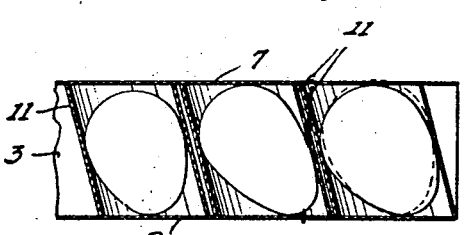
Fig. 4 is a detail sectional view through a portion of the box, showing the position of the eggs therein.

The eggs as shown, particularly in Fig. 4, are supported by the middle portion of the pocket walls, the eggs in a sense being swiveled and free to tilt in the pocket, so that in case the egg projects above the upper edge of its pocket when inserted therein, pressure on the top of the egg instead of crushing the shell, will tilt it and swing its projecting end down within the pocket, while the lower end will tilt outwardly toward the pocket wall. In other words, the egg is not rigidly held in the pocket and incapable of movement under pressure or in case the egg happens to be a little longer than the pocket, but is so supported that it may accommodate itself automatically to different conditions and thereby prevent the large amount of breakage usually incidental to the way the egg is supported in its pocket. Breakage of the eggs is also prevented by having the lower ends at one side of the center of the bottom of the pocket, thereby throwing the weight of the egg nearer to one side, while that portion of the bottom between the egg and the opposite wall being flexible and yielding under pressure, thereby reduces the danger of crushing the egg.

Figure 2:
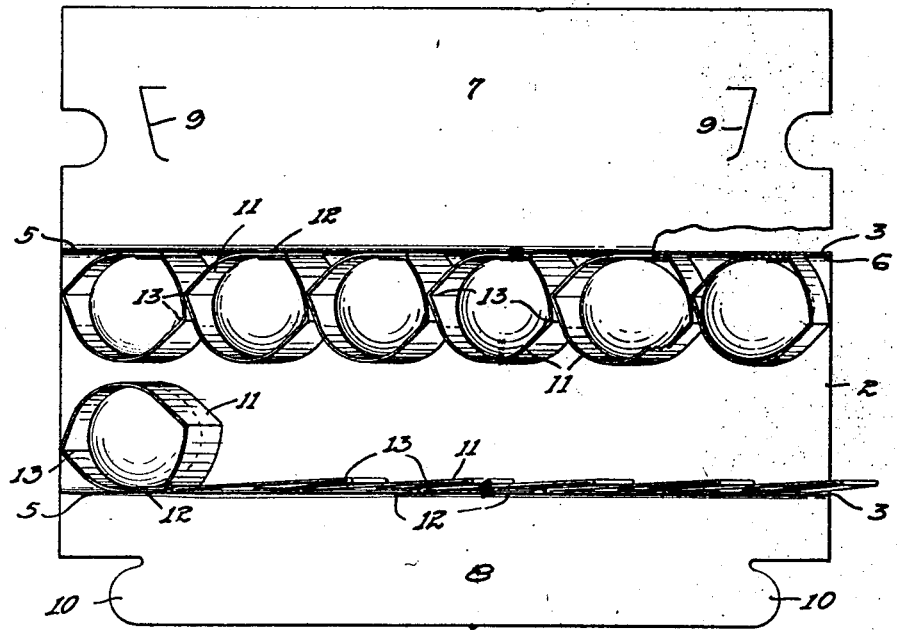
Fig. 2 is a top view of the box, partially folded and partially filled with eggs.

As shown clearly in Figs. 2 and 3, the pockets are tilted or mounted on the walls of the box at an inclination to the vertical so that when the eggs are placed therein the ends of one row will be in staggered relation to the ends of the eggs of the adjacent rows, above and below, and hence the boxes, when placed in the case, will not occupy as much room vertically as they would if the pockets were arranged upright, so that the eggs would be directly one over the other. The case 14 in which the boxes are packed may therefore be of less depth for a given number of boxes than would be necessary if the pockets stood upright.

This case, as indicated in Fig. 3, has a sheet 15 of suitable yielding material placed in the bottom, on which the first layer or row of pockets are supported. No division strips or sheets will be necessary between the layers of boxes, and they may be placed one above another until the top of the case is reached. The boxes may be arranged transversely of the case, as shown in Fig. 5, or lengthwise thereof, if preferred, or one layer may be arranged crosswise and the next one lengthwise, my purpose being to provide a case in which the filled boxes may be packed and removed as fast as needed for delivery, each box containing a dozen eggs packed in such a way that handling of each egg is unnecessary and the eggs being so supported in the pockets that filler sheets or strips or other means for preserving the eggs from breakage are entirely eliminated.

The pockets or cells for the eggs being open at each end, the box may be opened and the rows of eggs therein easily and quickly candled, each egg being supported by the pressure of its pocket wall thereon and held against accidentally falling out of the pocket during the candling operation.

I claim as my invention:

1. The combination, with a casing having a bottom and side walls and a cover, of a series of egg cells or pockets formed of flexible material mounted obliquely independently of each other on the vertical side walls of said casing, said cells being folded along substantially opposite parallel lines and the material composing said cells being flexible and resilient to accommodate itself to eggs of different sizes and grip them with a yielding pressure.

2. An egg container comprising a flexible blank folded to form a bottom, side walls and a cover, a series of egg cells or pockets obliquely mounted on the vertical side walls of said container, each cell being composed of flexible material having oppositely arranged score lines in its walls for folding the cell against the wall of the container when not in use, said cells when opened assuming a substantially oval form with the folds of adjacent cells lapping by each other, the material composing said cells being sufficiently resilient to grip the eggs inserted therein with a yielding pressure and each cell having freedom of movement on its supporting wall independently of the other cells.

3. An egg box comprising a blank scored to form a bottom, side walls and cover flaps, a plurality of egg pockets or cells attached to said side walls, said pockets being obliquely mounted and the eggs being supported at their middle portions by the walls of said pockets, pressure on the projecting ends of the eggs tilting them on their bearings in said pockets to assume an inclined position wholly within the pockets, the material composing said pockets being scored vertically along parallel lines for folding to a flattened position against the side wall of the box, or opening to receive the eggs, the walls of the box gripping the eggs and accommodating themselves to eggs of different sizes.

4. An egg container comprising a blank folded to form a bottom, side walls and cover, a series of egg cells mounted obliquely on the side walls of said blank, said cells being composed of flexible resilient material having score lines formed in their opposite walls for folding the cells against the side walls of the container, said walls being resilient and exerting a yielding pressure on the eggs inserted into the cells, each egg with its cell being free to rock on the supporting wall of the container independently of the other cells, the oblique arrangement of said cells preventing direct transmission of pressure from the eggs of one container to the eggs of an adjacent container.

5. The combination, with an egg case, of a series of egg containers fitting therein, each container being composed of flexible material and folded to form a bottom, side walls and a top, a series of egg cells mounted in rows upon said side walls in opposing relation, said cells being obliquely arranged so that when the containers are placed in the case, the lower ends of the eggs of one layer will be in staggered relation to the upper ends of the eggs of the next layer beneath, said cells being folded lengthwise along parallel lines and being sufficiently resilient to grip the eggs and hold them with a yielding pressure while the cells accommodate themselves to eggs of different sizes, said cells being free to oscillate in said containers and the end cells having yielding portions of their walls interposed between the eggs in such cells and the vertical walls of said case.

6. The combination, with an egg case, of a series of egg containers fitting therein, each container comprising a blank folded to form a bottom, side walls and cover, a series of egg cells obliquely mounted on the side walls of each container, each cell being scored lengthwise in its opposite walls for folding the cell against the wall of the container and composed of resilient material for gripping the egg therein with a yielding pressure, the oblique arrangement of said cells providing spaces between the walls of each of the end cells and the vertical walls of the egg case and the eggs in said end cells being separated from the vertical walls of the egg case by the yielding walls of said end cells and said spaces.

7. An egg container comprising a flexible blank folded to form a bottom, side walls and a cover, a series of egg cells obliquely mounted on the vertical side walls of said container, each cell being composed of flexible material having two oppositely arranged score lines in its walls and composed of flexible, resilient material for gripping the eggs when the cells are opened along said score lines and the eggs inserted therein, the oblique arrangement of the eggs in said cells preventing transmission of direct pressure from the eggs of one container to those of the adjacent containers and said eggs and cells being free to oscillate on the walls of said containers when subjected to shock or jar.

In witness whereof I have hereunto set my hand this 12th day of February, 1917.

BENJAMIN F. BAILEY.